(12) United States Patent
Altknecht et al.

(10) Patent No.: US 10,580,451 B2
(45) Date of Patent: Mar. 3, 2020

(54) DISC STORAGE CASSETTES COMPRISING INDEX FEATURES

(71) Applicant: International Business Machines Corporation, Armonk, NY (US)

(72) Inventors: David J. Altknecht, San Jose, CA (US); Donald S. Bethune, San Jose, CA (US); William M. Dyer, San Jose, CA (US); A. David Erpelding, San Jose, CA (US); Steven R. Hetzler, Los Altos, CA (US); Drew B. Lawson, San Jose, CA (US); Daniel F. Smith, Felton, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/457,629

(22) Filed: Jun. 28, 2019

(65) Prior Publication Data

US 2019/0325911 A1    Oct. 24, 2019

Related U.S. Application Data

(63) Continuation of application No. 16/234,359, filed on Dec. 27, 2018, now Pat. No. 10,438,629, which is a
(Continued)

(51) Int. Cl.
*G11B 17/038* (2006.01)
*G11B 17/22* (2006.01)
(Continued)

(52) U.S. Cl.
CPC ............ *G11B 17/038* (2013.01); *G11B 17/08* (2013.01); *G11B 17/225* (2013.01); *G11B 17/28* (2013.01);
(Continued)

(58) Field of Classification Search
CPC ......... G11B 17/08; G11B 17/22; G11B 17/26; G11B 17/28
See application file for complete search history.

(56) References Cited

U.S. PATENT DOCUMENTS

| 4,173,427 A | 11/1979 | Beuch et al. |
| 4,226,570 A | 10/1980 | Holecek et al. |
(Continued)

FOREIGN PATENT DOCUMENTS

| CN | 102598136 A | 7/2012 |
| CN | 204149156 U | 2/2015 |
(Continued)

OTHER PUBLICATIONS

Watanabe, A et al., "Optical library system for Long-term preservation with extended error correction coding", Proceedings of the IEEE Symposium on Massive Storage Systems and Technologies, 2013, pp. 1-18, IEEE Computer Society, United States.
(Continued)

*Primary Examiner* — Brian E Miller
(74) *Attorney, Agent, or Firm* — Sherman IP LLP; Kenneth L. Sherman; Hemavathy Perumal

(57) ABSTRACT

A disc cassette includes a curved portion. The curved portion includes multiple ribs that define multiple disc slots. The disc slots are configured to hold multiple discs that are spaced apart by the ribs. The disc cassette further includes multiple index features positioned on an inside edge of the curved portion. The index features are configured to allow alignment of a kicker device of a disc retrieval unit (DRU) to a disc of the disc cassette to lift the disc into a disc gripper device without disturbing one or more other discs of the disc cassette that are adjacent to the disc.

5 Claims, 18 Drawing Sheets

Related U.S. Application Data continuation of application No. 15/925,994, filed on Mar. 20, 2018, now Pat. No. 10,242,705, which is a continuation of application No. 15/456,433, filed on Mar. 10, 2017, now Pat. No. 9,984,722, which is a continuation of application No. 15/046,404, filed on Feb. 17, 2016, now Pat. No. 9,633,686.

(51) Int. Cl.
  *G11B 23/03* (2006.01)
  *G11B 17/28* (2006.01)
  *G11B 17/08* (2006.01)

(52) U.S. Cl.
  CPC ...... *G11B 23/0323* (2013.01); *G11B 23/0325* (2013.01); *G11B 17/22* (2013.01)

(56) References Cited

U.S. PATENT DOCUMENTS

| | | |
|---|---|---|
| 4,567,584 A | 1/1986 | Kawakami |
| 4,580,254 A | 4/1986 | Hojyo et al. |
| 4,589,101 A | 5/1986 | Schatteman et al. |
| 4,599,716 A | 7/1986 | Shimbo |
| 4,608,679 A | 8/1986 | Rudy et al. |
| 4,633,452 A | 12/1986 | Shimbo et al. |
| 4,695,990 A | 9/1987 | Kawakami |
| 4,815,055 A | 3/1989 | Fago, Jr. et al. |
| 4,815,057 A | 3/1989 | Miller et al. |
| 4,831,549 A | 5/1989 | Red et al. |
| 4,901,172 A | 2/1990 | Nakazawa et al. |
| 4,989,191 A | 1/1991 | Kuo |
| 5,050,020 A | 9/1991 | Campbell et al. |
| 5,056,073 A | 10/1991 | Fitzgerald et al. |
| 5,067,116 A | 11/1991 | Kadrmas |
| 5,107,475 A | 4/1992 | Serita et al. |
| 5,123,000 A | 6/1992 | Fitzgerald et al. |
| 5,136,562 A | 8/1992 | Staar |
| 5,207,727 A | 5/1993 | Pearce et al. |
| 5,236,296 A | 8/1993 | Ostwald |
| 5,242,259 A | 9/1993 | Yeakley |
| 5,253,911 A | 10/1993 | Egan et al. |
| 5,274,620 A | 12/1993 | Sipos |
| 5,289,441 A | 2/1994 | Domberg et al. |
| 5,292,222 A | 3/1994 | Malagrino et al. |
| 5,303,214 A | 4/1994 | Kulakowski et al. |
| 5,335,218 A | 8/1994 | Osada |
| 5,481,514 A | 1/1996 | Yamasaki et al. |
| 5,528,566 A | 6/1996 | McGee et al. |
| 5,544,148 A | 8/1996 | Nakamichi |
| 5,550,801 A | 8/1996 | Enomoto et al. |
| 5,555,239 A | 9/1996 | Takai et al. |
| 5,586,094 A | 12/1996 | Pines et al. |
| 5,588,796 A | 12/1996 | Ricco |
| 5,610,902 A | 3/1997 | Childers et al. |
| 5,631,785 A | 5/1997 | Dang et al. |
| 5,666,337 A | 9/1997 | Dang et al. |
| 5,684,654 A | 11/1997 | Searle et al. |
| 5,715,230 A | 2/1998 | Choi et al. |
| 5,726,967 A | 3/1998 | Tanaka et al. |
| 5,729,524 A | 3/1998 | Pines |
| 5,734,629 A | 3/1998 | Lee et al. |
| 5,754,519 A | 5/1998 | Bando |
| 5,764,617 A | 6/1998 | Furusawa et al. |
| 5,798,998 A | 8/1998 | Fukushima |
| 5,805,561 A | 9/1998 | Pollard |
| 5,818,802 A | 10/1998 | Menke et al. |
| 5,848,872 A | 12/1998 | Manes et al. |
| 5,923,638 A | 7/1999 | Watanabe |
| 5,943,306 A | 8/1999 | Silverstein |
| 5,953,293 A | 9/1999 | Kajiyama et al. |
| 5,959,958 A | 9/1999 | Inatani et al. |
| 5,978,323 A | 11/1999 | Nakamura |
| 6,016,291 A | 1/2000 | Joos |
| 6,064,544 A | 5/2000 | Wada |
| 6,084,832 A | 7/2000 | Furusawa et al. |
| 6,122,231 A | 9/2000 | Watanabe et al. |
| 6,178,153 B1 | 1/2001 | Cho et al. |
| 6,212,139 B1 | 4/2001 | Nakamura et al. |
| 6,301,218 B1 | 10/2001 | Jones |
| 6,373,796 B1 | 4/2002 | Herring et al. |
| 6,454,509 B1 | 9/2002 | Kappel et al. |
| 6,493,178 B1 | 12/2002 | Brace et al. |
| 6,587,405 B1 | 7/2003 | Klein |
| 6,683,827 B1 | 1/2004 | Omoto et al. |
| 6,731,455 B2 | 5/2004 | Kulakowski et al. |
| 6,802,070 B2 | 10/2004 | Britz et al. |
| 6,826,008 B2 | 11/2004 | Paulat |
| 7,145,841 B1 | 12/2006 | Miller |
| 7,193,810 B2 | 3/2007 | Dickey et al. |
| 7,212,375 B2 | 5/2007 | Dickey |
| 7,234,913 B2 | 6/2007 | Heiland et al. |
| 7,673,309 B2 | 3/2010 | Douglas et al. |
| 7,777,985 B2 | 8/2010 | Barkley |
| 8,041,449 B2 | 10/2011 | Noble |
| 8,042,123 B2 | 10/2011 | Terzis et al. |
| 8,134,799 B1 | 3/2012 | Ostwald |
| 8,276,170 B2 | 9/2012 | Douglass et al. |
| 8,281,327 B2 | 10/2012 | Goto et al. |
| 8,341,653 B2 | 12/2012 | Terzis et al. |
| 8,385,163 B2 | 2/2013 | Goyal et al. |
| 8,528,952 B2 | 9/2013 | Ostwald et al. |
| 8,701,862 B2 | 4/2014 | Takasawa et al. |
| 8,824,250 B2 | 9/2014 | Yoo |
| 8,899,406 B2 | 12/2014 | Nespeca |
| 9,230,591 B2 | 1/2016 | Kinoshita et al. |
| 9,428,336 B2 | 8/2016 | Hagen et al. |
| 9,633,686 B1 | 4/2017 | Altknecht |
| 9,672,863 B1 | 6/2017 | Altknecht |
| 9,741,389 B1 | 8/2017 | Altknecht |
| 9,741,390 B1 | 8/2017 | Altknecht |
| 9,984,722 B2 * | 5/2018 | Altknecht ............ G11B 17/038 |
| 10,242,705 B2 * | 3/2019 | Altknecht ............ G11B 17/038 |
| 2002/0044504 A1 | 4/2002 | Kabasawa |
| 2003/0117938 A1 | 6/2003 | Braitberg et al. |
| 2004/0080852 A1 | 4/2004 | Jenkins, Jr. et al. |
| 2004/0236465 A1 | 11/2004 | Butka et al. |
| 2005/0007896 A1 | 1/2005 | Haas |
| 2006/0005209 A1 | 1/2006 | Chiang |
| 2006/0021896 A1 | 2/2006 | Cleathero et al. |
| 2006/0136950 A1 | 6/2006 | Eberdorfer |
| 2007/0127323 A1 | 6/2007 | Owens |
| 2010/0287576 A1 | 11/2010 | Terzis et al. |
| 2012/0117578 A1 | 5/2012 | Goyal et al. |
| 2013/0256164 A1 | 10/2013 | Haggard |
| 2014/0126340 A1 | 5/2014 | Yoo |
| 2016/0090240 A1 | 3/2016 | Best et al. |
| 2017/0232619 A1 | 8/2017 | Altknecht |
| 2017/0236544 A1 | 8/2017 | Altknecht |
| 2018/0211691 A1 | 7/2018 | Altknecht et al. |
| 2019/0130939 A1 | 5/2019 | Altknecht et al. |

FOREIGN PATENT DOCUMENTS

| | | |
|---|---|---|
| EP | 924698 A2 | 6/1999 |
| EP | 1653461 A2 | 3/2006 |
| WO | 2010005624 A1 | 1/2010 |
| WO | 2014076978 A1 | 5/2014 |

OTHER PUBLICATIONS

International Search Report and Written Opinion dated Apr. 28, 2017 for International Application No. PCT/IB2017/0505592, pp. 1-12, State Intellectual Property Office of the P.R. China, Beijing, China.

Fujie, R. et al., "6 Disc In-dash CD Changer Deck", FUJITSU TEN TECH. J., No. 14, 2000, pp. 1-8, downloaded from: https://www.denso-ten.com/business/technicaljournal/pdf/14-1.pdf.

U.S. Non-Final Office Action for U.S. Appl. No. 15/046,395 dated Oct. 21, 2016.

U.S. Notice of Alllowance for U.S. Appl. No. 15/046,395 dated Mar. 30, 2017.

(56) References Cited

OTHER PUBLICATIONS

U.S. Non-Final Office Action for U.S. Appl. No. 15/046,401 dated Oct. 6, 2016.
U.S. Notice of Allowance for U.S. Appl. No. 15/046,401 dated Feb. 3, 2017.
U.S. Notice of Allowability for U.S. Appl. No. 15/046,401 dated Apr. 6, 2017.
U.S. Non-Final Office Action for U.S. Appl. No. 15/046,404 dated Sep. 8, 2016.
U.S. Notice of Allowance for U.S. Appl. No. 15/046,404 dated Dec. 16, 2016.
U.S. Notice of Allowability for U.S. Appl. No. 15/046,404 dated Feb. 1, 2017.
U.S. Non-Final Office Action for U.S. Appl. No. 15/078,857 dated Dec. 29, 2016.
U.S. Notice of Allowance for U.S. Appl. No. 15/078,857 dated Apr. 17, 2017.
U.S. Non-Final Office Action for U.S. Appl. No. 15/456,433 dated May 1, 2017.
U.S. Final Office Action for U.S. Appl. No. 15/456,433 dated Jul. 18, 2017.
U.S. Non-Final Office Action for U.S. Appl. No. 15/456,433 dated Sep. 18, 2017.
U.S. Notice of Allowance for U.S. Appl. No. 15/456,433 dated Jan. 26, 2018.
U.S. Non-Final Office Action for U.S. Appl. No. 15/494,368 dated May 24, 2018.
U.S. Notice of Allowance for U.S. Appl. No. 15/494,368 dated Sep. 14, 2018.
U.S. Notice of Allowability for U.S. Appl. No. 15/494,368 dated Nov. 2, 2018.
U.S. Non-Final office Action for U.S. Appl. No. 15/925,994 dated May 1, 2018.
U.S. Final Office Action for U.S. Appl. No. 15/925,994 dated Sep. 4, 2018.
U.S. Notice of Allowanance for U.S. Appl. No. 15/925,994 dated Nov. 5, 2018.
U.S. Corrected Notice of Allowance for U.S. Appl. No. 15/456,433 dated Apr. 24, 2018.
U.S. Non-Final Office Action for U.S. Appl. No. 16/234,359 dated Feb. 4, 2019.
U.S. Notice of Allowance for U.S. Appl. No. 16/234,359 dated May 21, 2019.
U.S. Non-Final Office Action for U.S. Appl. No. 16/173,975 dated May 30, 2019.
U.S. Non-Final Office Action for U.S. Appl. No. 16/1213,145 dated Jun. 10, 2019.

\* cited by examiner

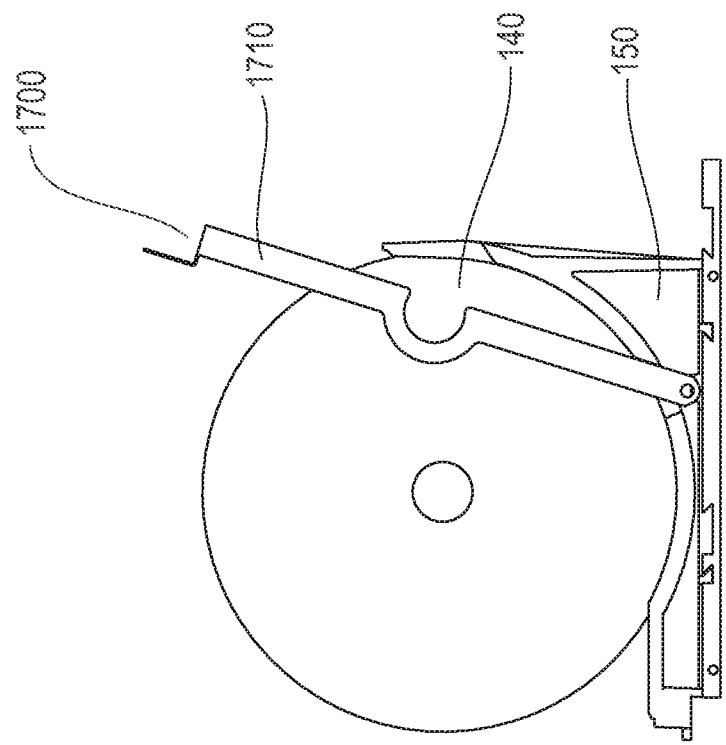
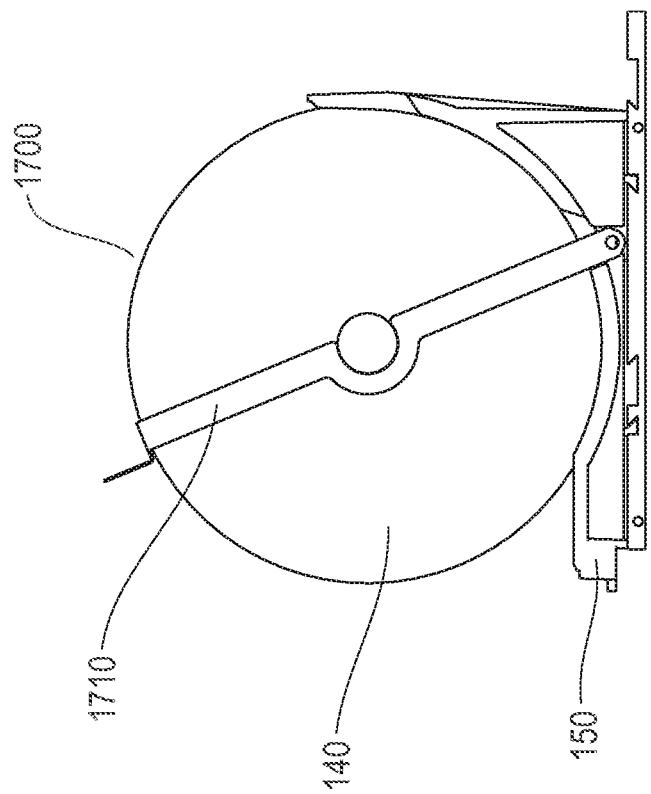
FIG. 17A
FIG. 17B

DISC STORAGE CASSETTES COMPRISING INDEX FEATURES

BACKGROUND

Disc libraries may be used for archival storage, where access times of minutes to hours are acceptable. Discs, such as optical storage discs, are stored within the disc libraries such that they are accessible by a disc retrieval unit (DRU) to move discs between storage locations and the drives that read and write the data on the discs.

SUMMARY

Embodiments relate to storage of discs in disc storage systems. In one embodiment, a disc cassette includes a curved portion configured to hold multiple discs. A platform portion abuts the curved portion. A movable bale is configured to maintain discs securely in the disc cassette except when rotated off the discs.

These and other features, aspects and advantages of the embodiments will become understood with reference to the following description, appended claims and accompanying figures.

BRIEF DESCRIPTION OF THE DRAWINGS

FIGS. 17A-B show side views of another bale of the disc cassette device configured to receive a locking rod, according to an embodiment.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments include a disc cassette device for holding discs in an optical robotic disc library, for storage and retrieval, etc. In one embodiment, the disc cassette device: has an open structure that minimally interferes with a disc retrieval unit (DRU) gripper device as it picks up or returns discs; holds closely spaced discs (disc pitch between 1.75 and 2 mm) in well-defined locations without contact between adjacent discs; has index features to allow the DRU to accurately align a gripper device and a disc kicker device to a selected disc; provides for the selected disc to be moved vertically by a small distance by a disc kicker device into the gripper jaw devices and then, once gripped, horizontally onto the DRU; is accurately aligned and secured to the whole library with mounting features on its base; and securely retains the discs even if the unit is subjected to shock, vibration or other motion, or if loaded disc cassettes are being moved into or out of the library (e.g., from an enclosure, etc.). In one embodiment, the curved portion of the disc cassette device stably retains discs at the lowest points of the curved disc slots, and any disc can exit the cassette by a straight horizontal motion after being vertically lifted from its rest position clear of the bottom surface of the disc slot of the horizontal portion of the disc cassette extending toward the DRU.

Figure 1:
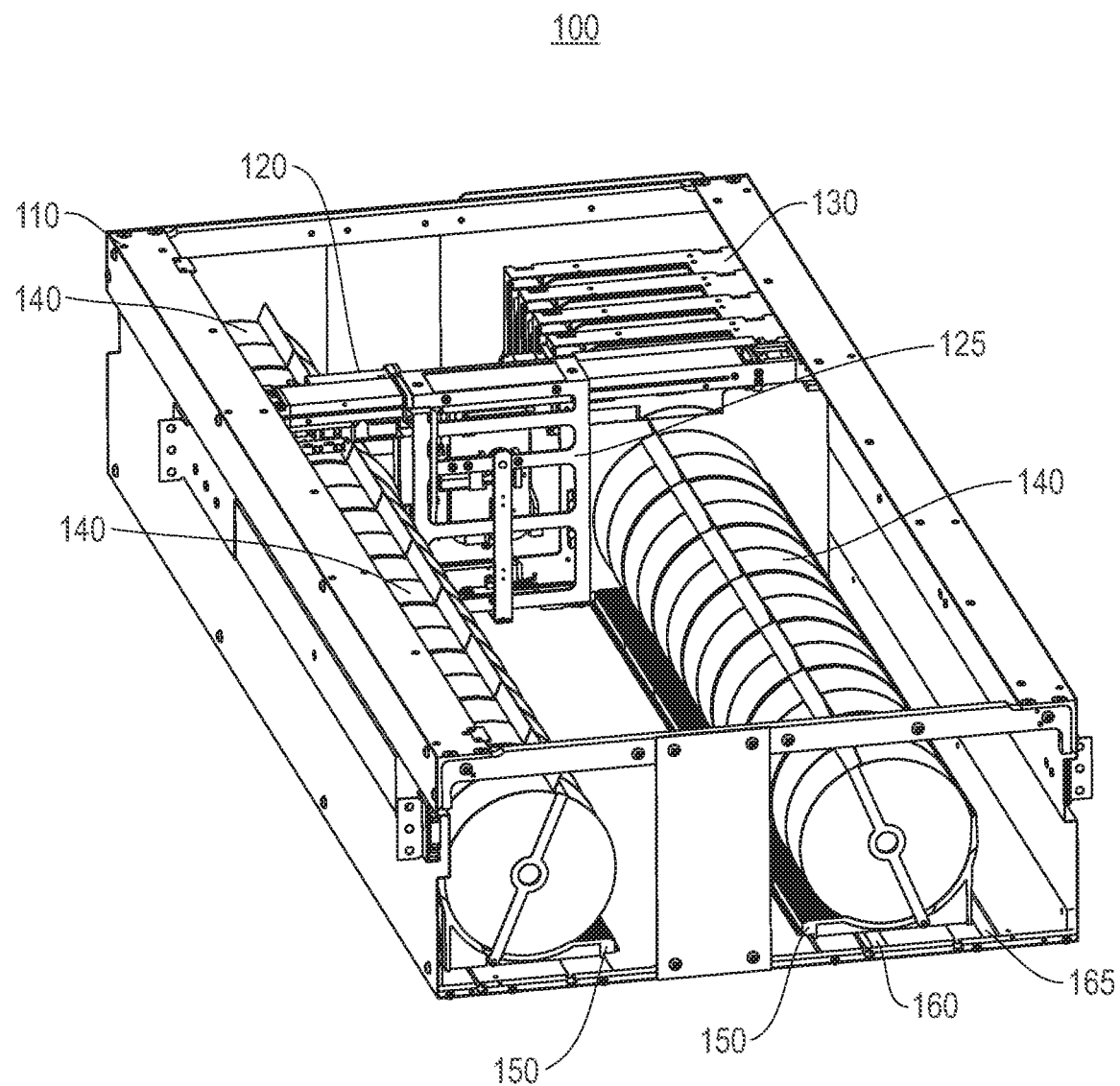
FIG. 1 is a high performance optical storage system that may implement a disc cassette device, according to an embodiment.

FIG. 1 is a high performance optical storage system (or robotic disc library) 100 that may implement a disc cassette device 150, according to an embodiment. In one embodiment, the high performance optical storage system 100 includes an enclosure 110, a moveable arm 120 connected to a DRU 125 that includes a disc gripper device, multiple optical disc drives 130, multiple optical disc-based media (discs) 140, disc cassette devices 150, and tracks or mounting rails 160 and 165 that hold the disc cassette devices 150 in place. In one embodiment, the enclosure 110 provides a stable platform and protection from the environment. In one example, the enclosure includes filter material connected to cooling fans (not shown) and a top enclosure (not shown for internal viewing). In one embodiment, the enclosure may be sized as a typical 19-inch rack mounted device with rack mounting connectors. Depending on the space and enclosure size chosen, the enclosure 110 may have a greater capacity of optical disc drives 130, disc cassette devices 150, and thus, discs 140. In one example, the disc cassette devices 150 are placed within the enclosure 110 on either side (e.g., left and right sides). In one example, additional space for disc cassette devices 150 and discs 140 is available adjacent the disc drives 130 (e.g., towards the front of the enclosure 110). In wider enclosures, more disc drives 130 may be positioned adjacent each other on the left and right side of the enclosure when more available space for disc drives 130 is available. In one embodiment, the moveable arm 120 moves through motors and gears on tracks within the enclosure 110 to move the DRU 125 from the back of the enclosure 110 to the front of the enclosure 110. The DRU 125 is moveable to either side of the enclosure 110 to retrieve a disc 140 using the disc gripper device for placement in a disc drive 130 or for replacement back to a disc cassette device 150. In other embodiments, other configurations of stored discs 140, disc drives 130 and the DRU 125 may be used.

Figure 2:
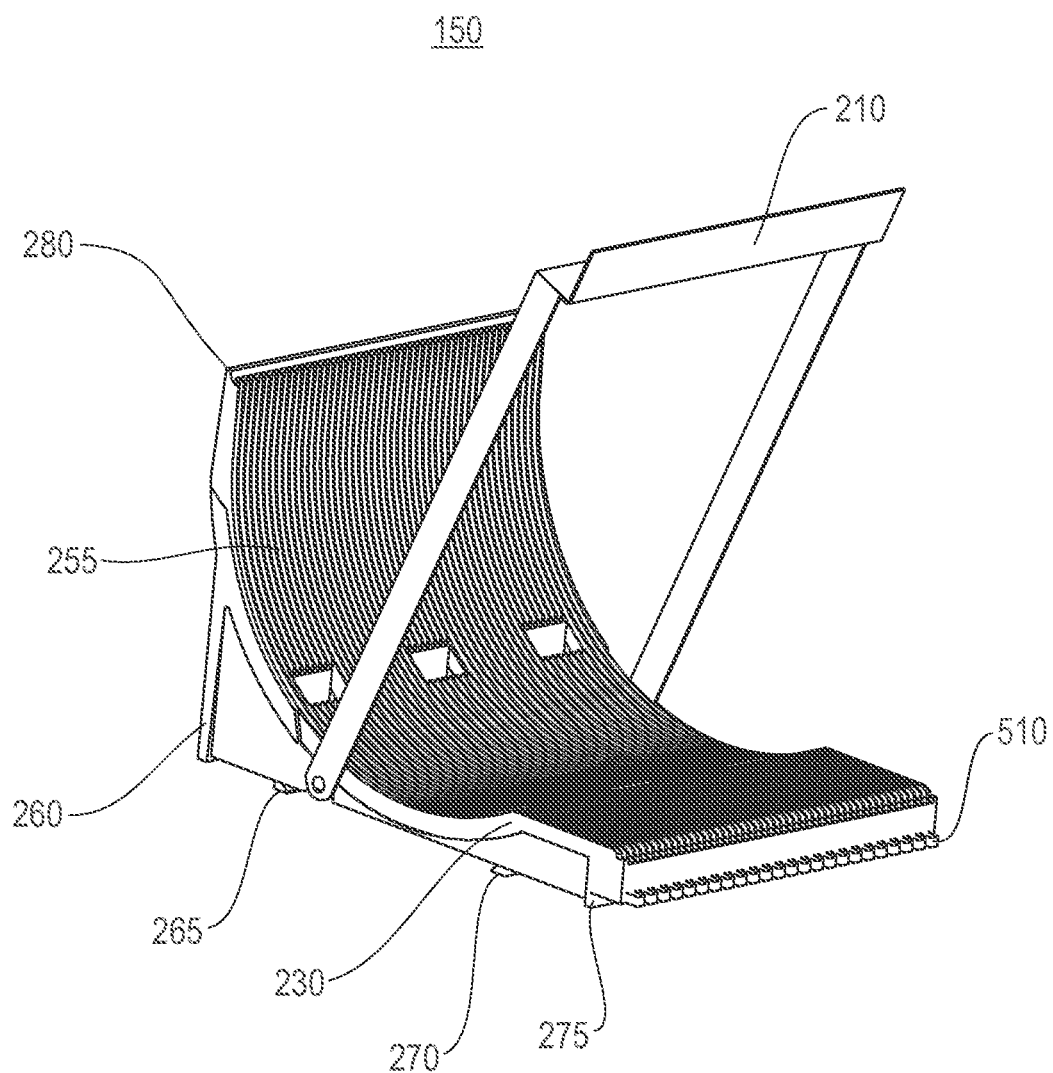
FIG. 2 shows a disc cassette device in an empty state, according to an embodiment.

FIG. 2 shows a disc cassette device 150 in an empty state, according to an embodiment. In one example, discs 140 with nominal thickness (e.g., 1.2 mm) are spaced apart by thin (~0.4 mm) ribs 520 (FIG. 5) 1.5 mm high to give a disc pitch between 1.75 and 1.82 mm. The ribs 520 keep adjacent discs 140 from touching, with a disc pitch less than 166% of the disc thickness, and with the fixed portion of the disc cassette device 150 allowing any disc 140 to exit its disc slot 255 without impediment by in-disc-plane straight-line motions over an angular range of more than 45° from the disc's 140 rest position, and more than 90° from a position displaced from its rest position by less than 18 mm. With that pitch range, a 39 inch deep, 4 U high library will have a capacity between 815-850 discs (e.g., assuming the unit has six (6) optical disc drives 130, FIG. 1). A bale 210 serves to retain the discs in the disc cassette device 150 slots 255 except when a disc is being retrieved or returned. In one embodiment, the bale 210 may be optional. The inside edge of the disc cassette device 150 incorporates index features or teeth 510 (FIG. 5) with edges aligned with the centers of the slots 255 in the disc cassette device 150, and hence closely to the centers of discs in those slots 255.

In one embodiment, the disc cassette device 150 holds the discs coaxially in a vertical orientation. In one embodiment, the ribs 520 are designed to limit lateral contact with a disc 140 surface to that portion of the outer edge. The disc cassette device 150 has features that allow the DRU 125 (FIG. 1) to be positioned to within +/−0.1 mm so a disc selector or kicker device of a DRU 125 can lift one disc 140 into a disc gripper device without disturbing adjacent discs 140. The disc cassette device has additional features referred to as mounting rail or track connectors 260, 265 and 270, 275 that position it with respect to a mounting rail or track 160/165 (FIG. 1) or 810 (FIG. 8) on the enclosure 110 bottom portion. In one embodiment, the track connectors 265 and 270 have a "dove tail" feature that fits within the mounting rail or track portions 165 and 160, respectively. In one example, the mounting rail or track connectors are spring-like or flexible for gripping the mounting rails or tracks 160/165 or 810.

In one embodiment, the disc cassette device 150 contacts the outer rim of the disc 140 over an angle spanning substantially less than 180 degrees when the disc is at home in a disc cassette device 150. The disc cassette device 150 has a shorter lip 230, and a taller lip 280. As described, a combination of gravity and friction hold the discs 140 in place. In one embodiment, the disc cassette device 150 may be formed through injection molding or similar techniques. In one embodiment, drafted surfaces allow the disc cassette device 150 to be injection molded. In one example, multiple drafted surfaces provide rigidity to the bottom of the disc cassette device 150. In one embodiment, the surface area of the drafted surfaces on the bottom of the disc cassette device 150 is greater than the surface area of the ribs 520 (FIG. 5), allowing the ribs 520 to release from the injection mold prior to the bottom of the disc cassette device 150 releasing from the injection mold. In one example, the ribs 520 and slots 255 are devoid of ejector pin marks.

Figure 3:
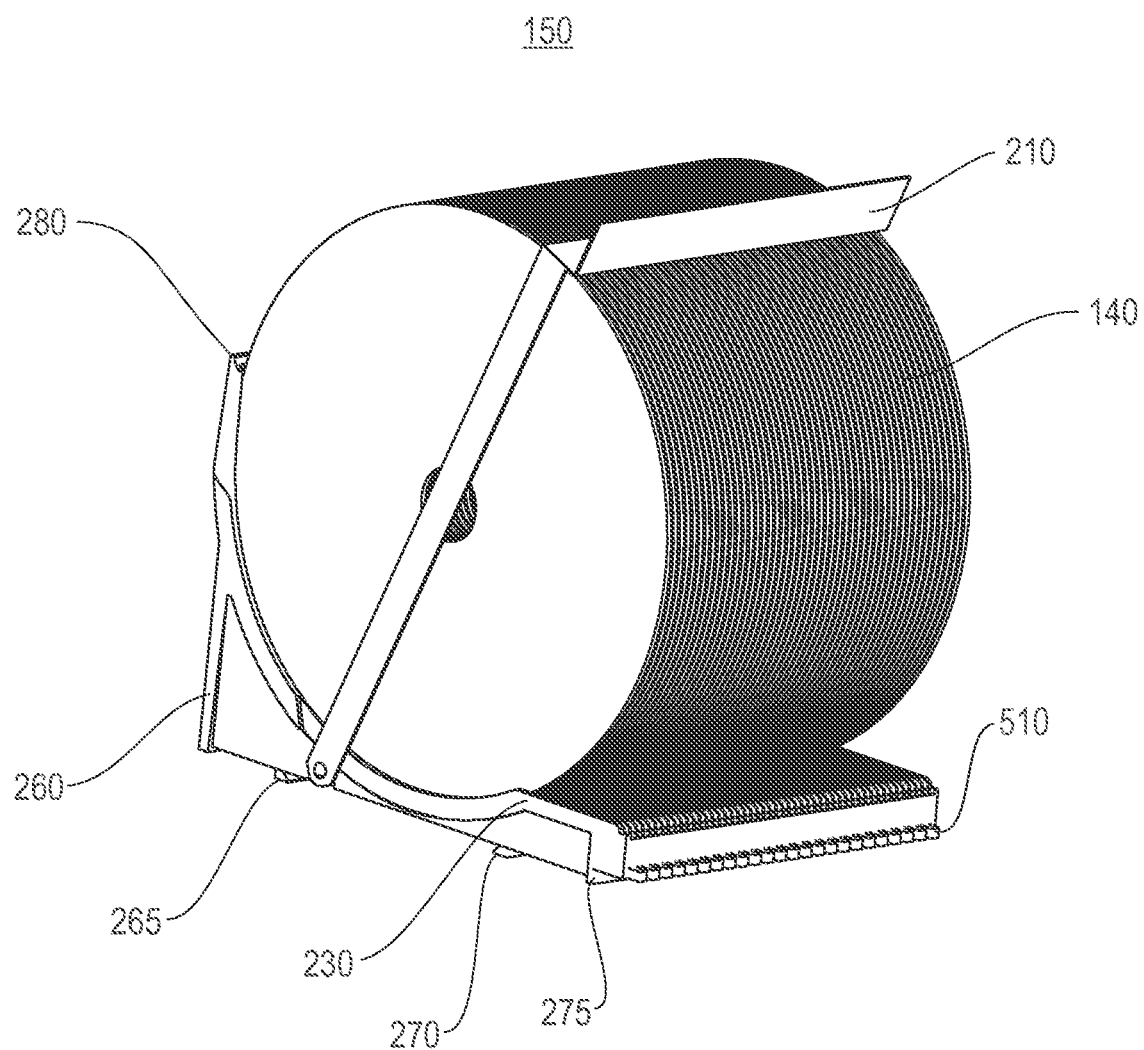
FIG. 3 shows the disc cassette device of FIG. 2 loaded with discs, according to an embodiment.

FIG. 3 shows the disc cassette device 150 fully loaded with discs 140, according to an embodiment. In one embodiment, the bale 210 may be spring loaded (e.g., with return spring 1010, FIG. 15) and holds the discs 140 in place to prevent movement during operation of the DRU 125 (FIG. 1), loading and unloading the disc cassette device 150 from an enclosure 110, etc.

Figure 4:
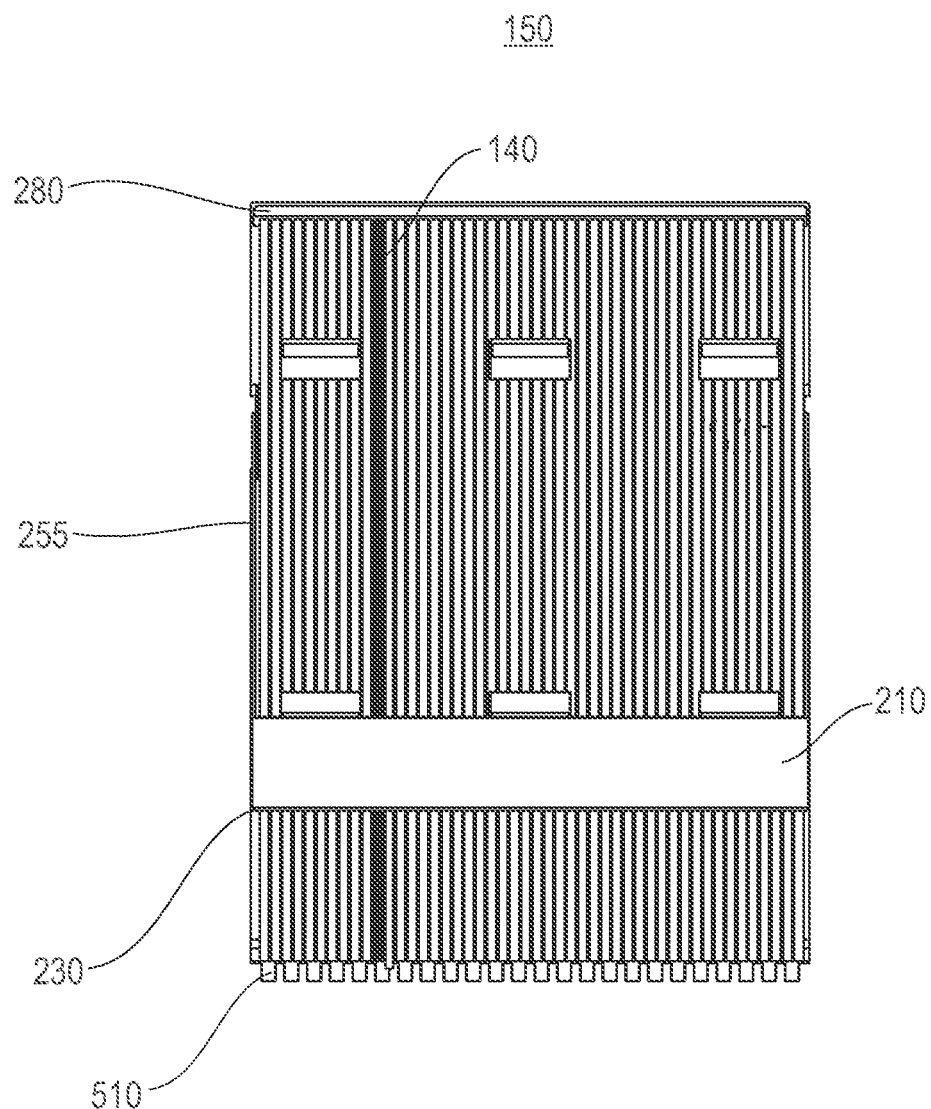
FIG. 4 shows a top view of the disc cassette device of FIG. 2 with a single disc, according to an embodiment.

FIG. 4 shows a top view of the disc cassette device 150 with a single disc 140 loaded, according to an embodiment. In one example, the disc gripper device of the DRU 125 accesses the disc 140 that is pushed or kicked vertically by a disc kicker of the DRU.

Figure 5:
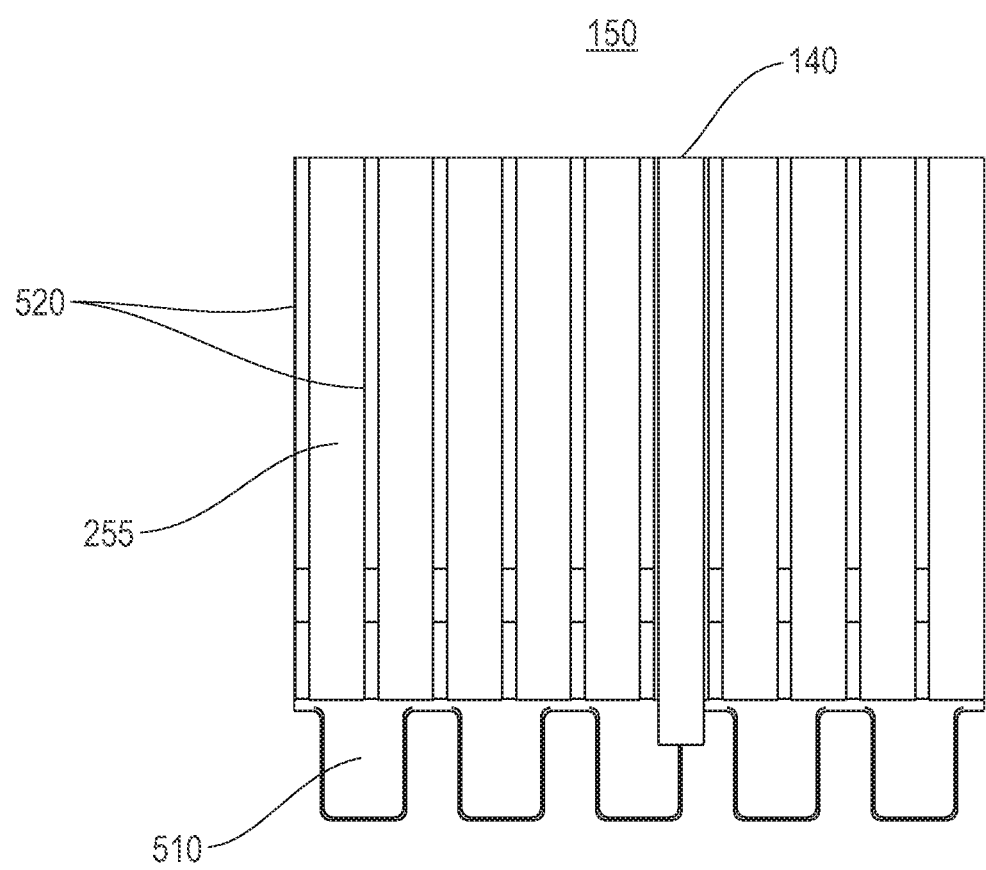
FIG. 5 shows a magnified view of the disc cassette device of FIG. 4 with a single disc, according to an embodiment.

FIG. 5 shows a magnified view of the disc cassette device 150 of FIG. 4 with a single disc 140, according to an embodiment. The ribs 520 form the slot 255 for holding the discs 140 in place and from contacting one another. The index features or teeth 510 enable precise DRU 125 alignment to discs 140 based on using an optical sensor. In one embodiment, the index features 510 positions are precisely related to the positions of the disc slots 255 defined by the ribs 520. In one example, the index features 510 are twice as wide as the disc pitch, positioned such that each edge of each index feature 510 or tooth can be associated with the center of a disc slot 255.

Figure 6:
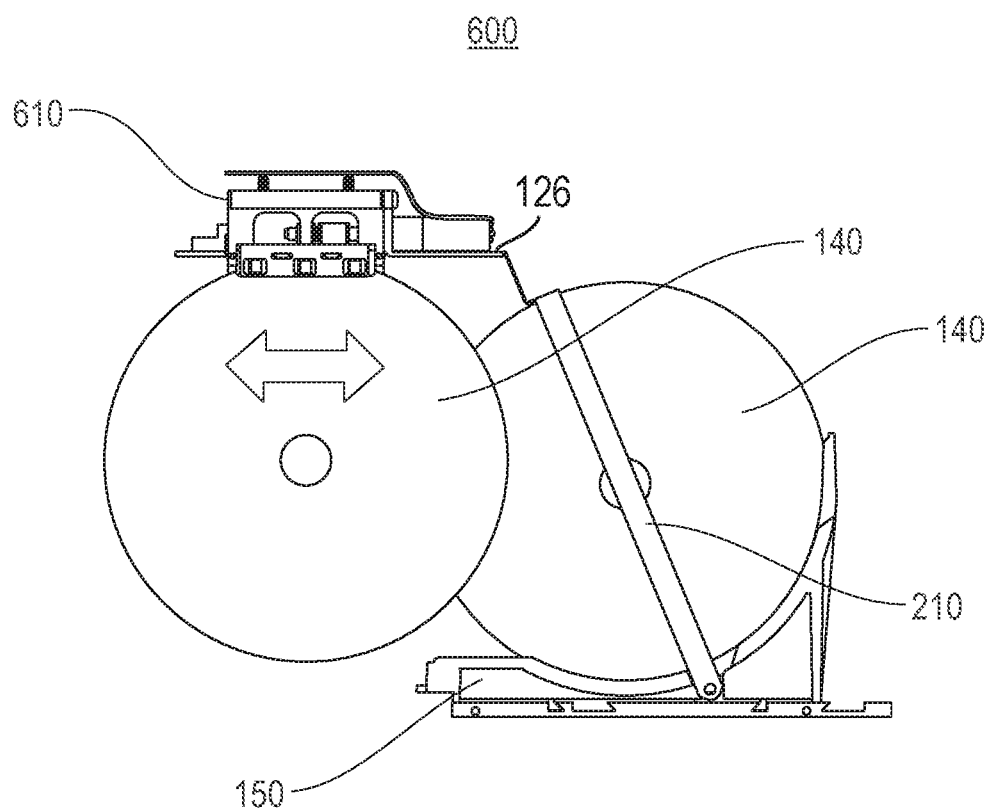
FIG. 6 shows a view of horizontal disc access by a disc retrieval unit (DRU) to/from a disc cassette device, according to an embodiment.

FIG. 6 shows a view 600 of horizontal disc access by a DRU 125 with a disc gripper device 610 to/from a disc cassette device 150, according to an embodiment. In one embodiment, a disc 140 is retrieved from the cassette device 150 with minimal motion and mechanical interference. A disc 140 in the disc gripper device 610 (that is about 8 mm higher than the discs 140 in the disc cassette device 150) is moved onto or off of the DRU by a straight horizontal motion. The bottom of the disc 140 is guided by the horizontal ribs 520 (FIG. 5) on the left edge of the disc cassette device 150 as it enters or leaves a guide slot on the DRU. In one example, the ribs 520 and surface at their base beyond the 28° point (extending towards the front of the disc cassette device 150) are straight and horizontal. With this geometry, a typical 120 mm diameter disc held in the disc gripper device 610 8 mm higher than the discs in the cassette will clear the surface at the base of the horizontal ribs 520 by 1 mm, allowing the disc to be moved horizontally onto or off of the DRU without interference. In one example, the horizontal ribs 520 prevent motion perpendicular to the disc's 140 surface and prevent contact with adjacent discs 140 as the bottom edge of the disc 140 enters or leaves the end of the DRU guide slot adjacent to the cassette device 150. In one example, a bale 210 is pushed by an arm 126 of the DRU 125 to move the bale 210 off of the disc or discs 140 to enable retrieving and replacing discs 140 from/to the disc cassette device 150.

Figure 7:
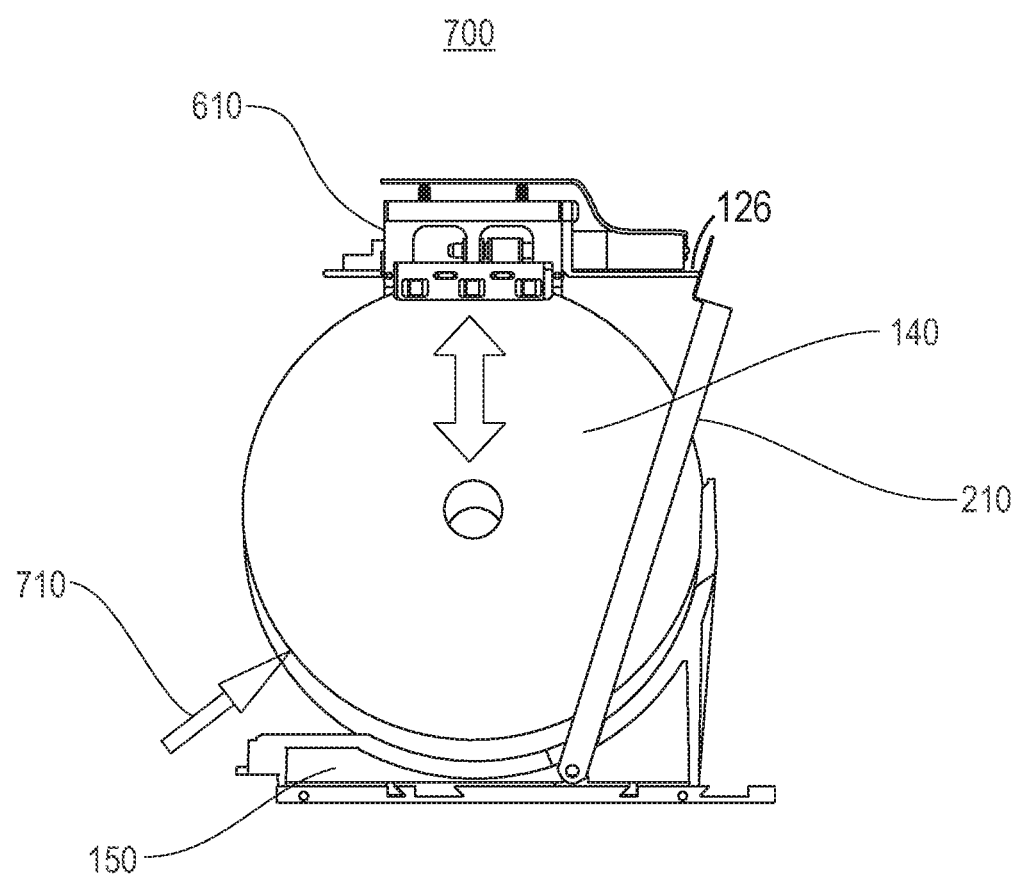
FIG. 7 shows a view of vertical disc access by a DRU to/from a disc cassette device, according to an embodiment.

FIG. 7 shows a view 700 of vertical disc access by a DRU disc gripper device 610 to/from the disc cassette device 150, according to an embodiment. In one example, to retrieve or return a disc 140, the disc gripper device 610 is aligned with a disc cassette device 150 slot 255 and positioned above the disc cassette device 150. The disc 140 is moved vertically into or out of the disc gripper device 610 jaw devices by the combination of forces provided by the disc kicker 710 on the left and the vertical back wall of the disc cassette device 150 to the right. The vertical ribs 520 on the back wall of the disc cassette device 150 also guide the disc 140 into or out of the disc gripper device 610 jaw devices and prevent contact with adjacent discs 140. Discs 140 in their resting positions contact the cassette over an angular sector of approximately 118°, spanning from the back-most point of the disc 140, down to its bottom point, and continuing up approximately 28° further. The disc cassette device 150 inside wall and ribs 520 above the disc 140 back-most point are straight and vertical.

In one example, the disc kicker 710, in combination with the vertical disc cassette device 150 back wall surface, moves the disc vertically 8 mm into the gripper device 610 jaw devices. The disc cassette device 150 vertical back wall ribs 520 constrain the disc 140 in a vertical position during this motion, guiding the disc 140. Discs 140 being returned to the disc cassette device 150 can be dropped vertically into the slots 255, or lowered using the disc kicker 710 of the DRU 125.

Figure 8:
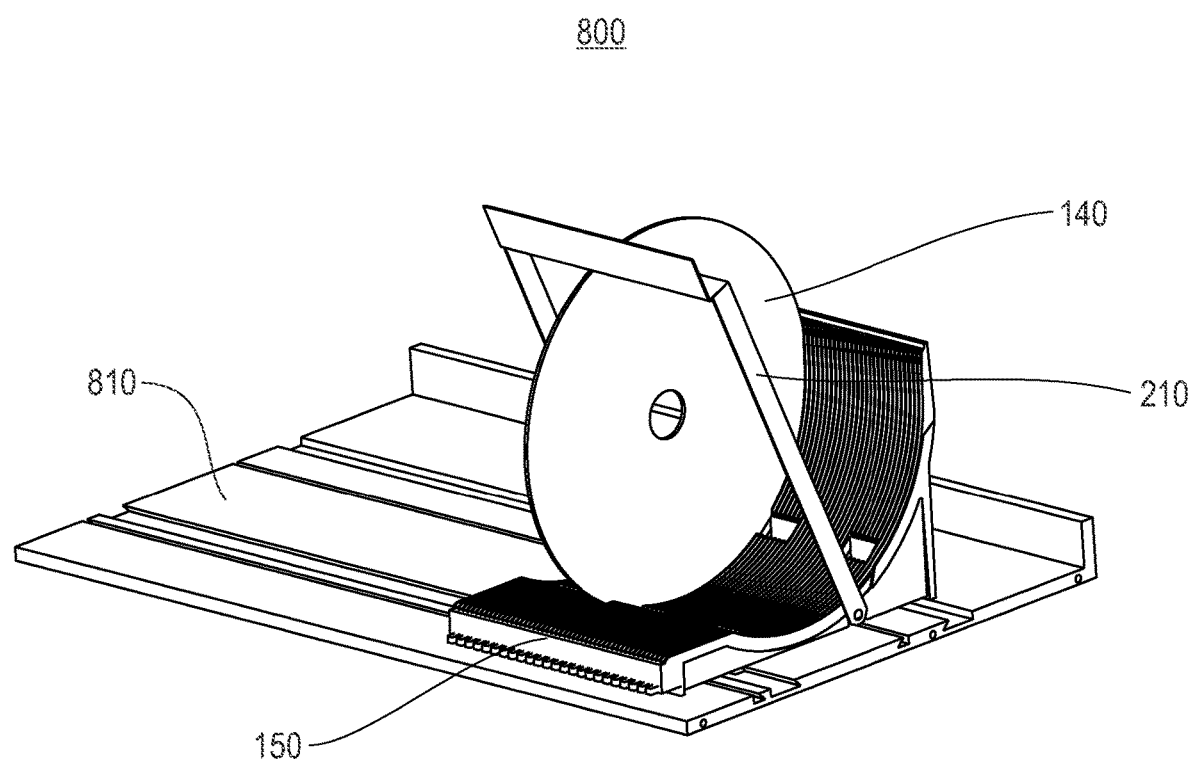
FIG. 8 shows a disc cassette device placed in a mounting rail or track, according to an embodiment.

FIG. 8 shows a view 800 of the disc cassette device 150 placed in a mounting rail or track 810, according to an embodiment. In one embodiment, disc cassette devices 150 are accurately and reproducibly located with respect to each other and the library by features that rest on and interlock with the mounting rail or track 810.

Figure 9:
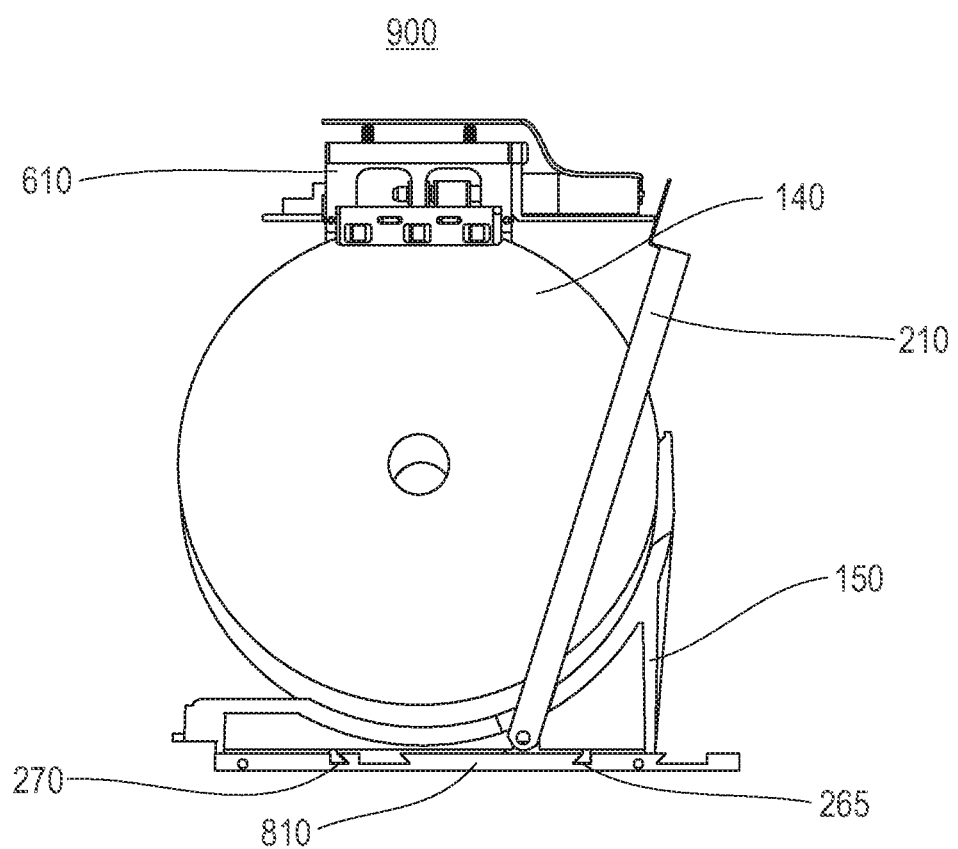
FIG. 9 shows a side view of disc cassette device placed in a mounting rail or track, according to an embodiment.

FIG. 9 shows a side view 900 of disc cassette device 150 placed in a mounting rail or track 810, according to an embodiment. In one embodiment, the horizontal portions of disc cassette device 150 bottom rest on the mounting rail or rack 810 to position the disc cassette device 150 vertically while wedged-shaped springs or flexible fingers (the track connectors 265) press the disc cassette device 150 down and to the right, and wedge-shaped fingers (the track connectors 270) that are non-flexible fix the disc cassette device's 150 horizontal position and rotational orientation. In one example, the wedged-shaped fingers are lodged in mating grooves in the mounting rail or rack 810. In one example, the wedged-shaped fingers have flat coupling surfaces and rows of the wedged-shaped fingers are disposed on a bottom side of the disc cassette device 150. In one embodiment, the wedged-shaped fingers are configured so that the coupling surface is pressed against the top surface of the mounting rail or rack 810 by the pressure of the wedged-shaped finger surfaces against mating surfaces in dovetail slots cut in the mounting rail or track 810, thus accurately defining the disc cassette device's 150 vertical and lateral positions and its rotational orientation.

Figure 10:
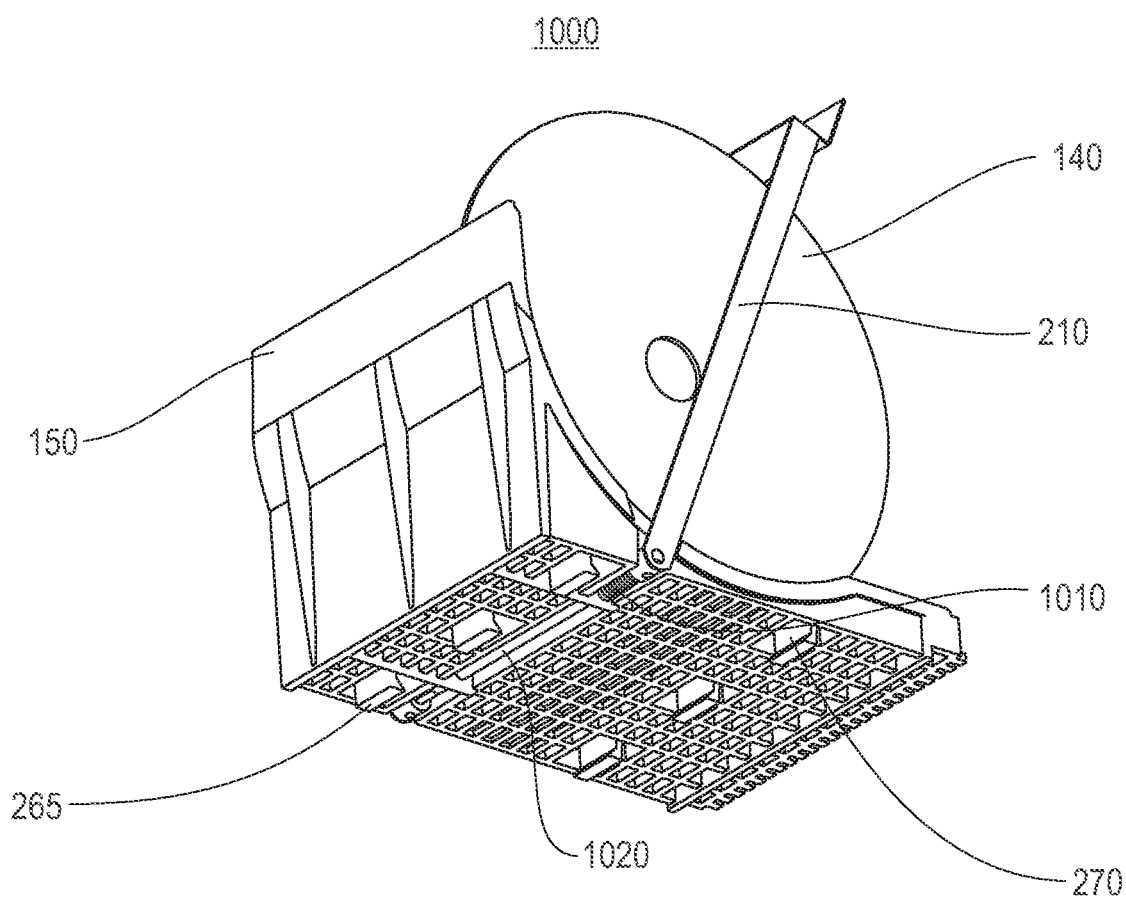
FIG. 10 shows a bottom perspective view of disc cassette device, according to an embodiment.
Figure 11:
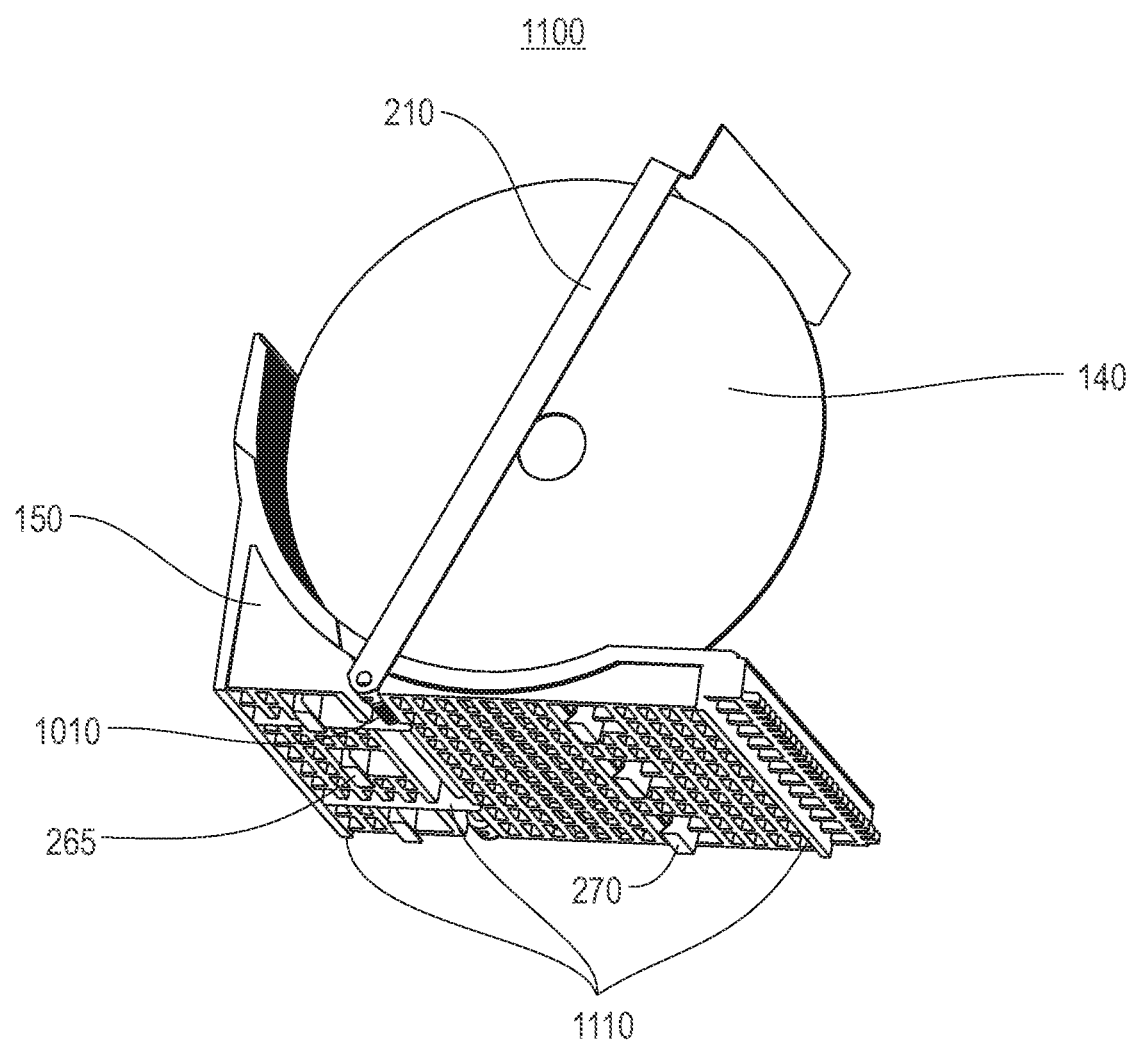
FIG. 11 shows another bottom perspective view of disc cassette device, according to an embodiment.

FIG. 10 shows a bottom perspective view 1000 of the disc cassette device 150, according to an embodiment. FIG. 11 shows another bottom perspective view 1100 of the disc cassette device 150, according to an embodiment. In one example, the horizontal reference surfaces 1110 and the wedged-shaped fingers (the track connectors 265 and 270) that position the disc cassette device 150 are shown from the bottom view. The back wedged-shaped fingers (track connectors 265) are longer and have more compliance, while the front wedged-shaped fingers (track connectors 270) are shorter and much stiffer. This arrangement reduces uncertainty in the disc cassette device 150 lateral and angular positions, since they are essentially controlled by the stiffer wedged-shaped fingers. The disc cassette device 150 retains the ability to slide along the mounting rail or track 810 (FIG. 8) and multiple disc cassette devices 150 may be loaded onto the mounting rail or track 810 adjacent to one another. In one embodiment, locking devices may be used at the beginning and end of the row of disc cassette devices 150 to fix their positions along the mounting rail or track 810, and thus fully fix their positions in the library. In one example, the bale 210, axle 1020, and bale return spring 1010 are viewable. The bale return spring 1010 provides for the bale 210 to be moved by the DRU 125 (FIG. 1) and return to its resting or disc locking/holding position. In one example, the bale 210 is configured to rotate on an axis below the rib 520 (FIG. 5) adjacent pairs and to maintain a disc-retention position based on the return spring 1010.

Figure 12:
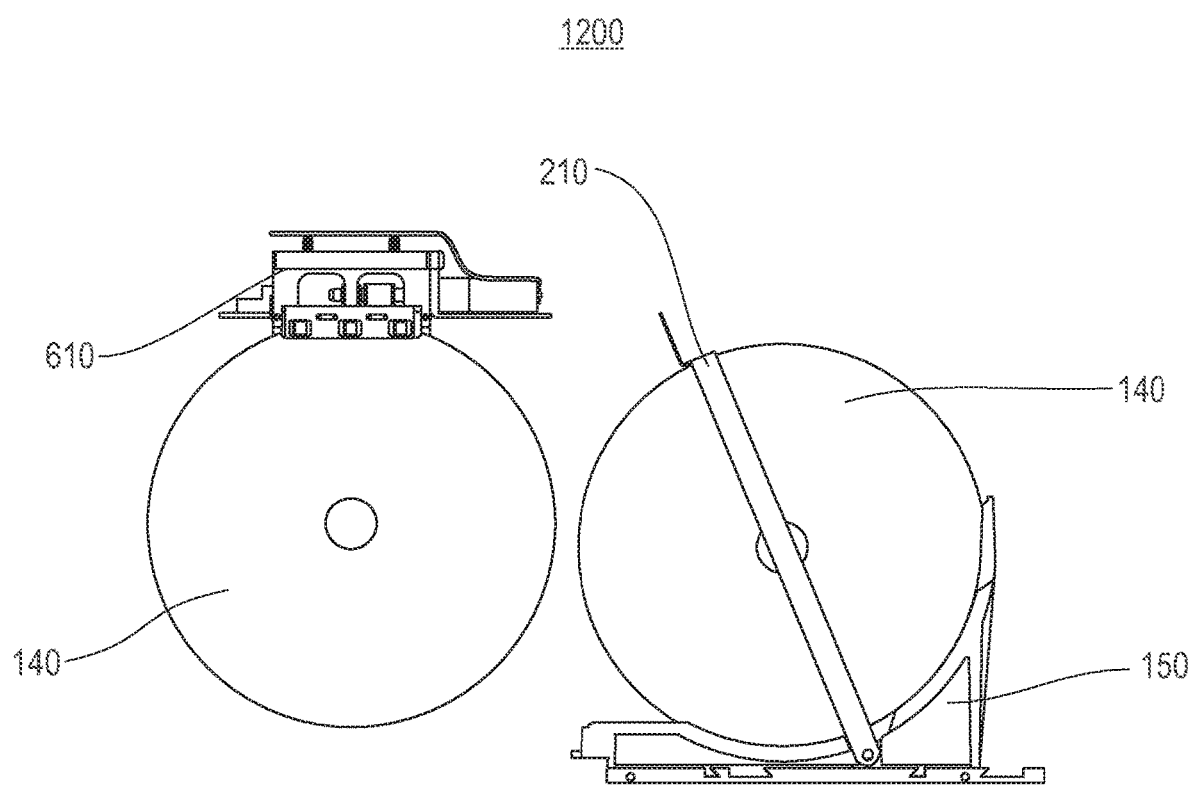
FIG. 12 shows a side view of the operation of a retaining bale of the disc cassette device, according to an embodiment.

FIG. 12 shows a side view 1200 of the operation of a retaining bale 210 of the disc cassette device 150, according to an embodiment. In one example, the disc 140 on the gripper device 610 of the DRU 125 is aligned with an empty slot (e.g., slot 255, FIG. 2) in the disc cassette device 150.

Figure 13:
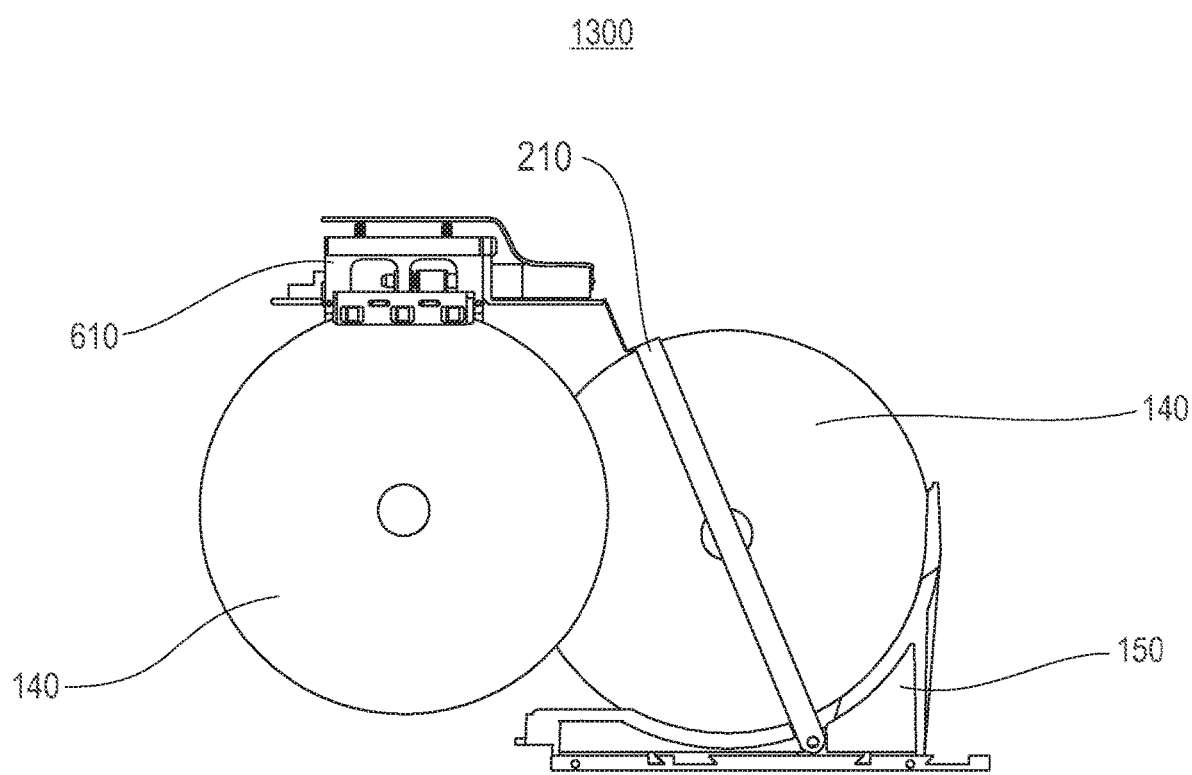
FIG. 13 shows a side view of a progressed operation of the retaining bale of the disc cassette device of FIG. 12, according to an embodiment.

FIG. 13 shows a side view 1300 of a progressed operation of the retaining bale 210 of the disc cassette device 150 of FIG. 12, according to an embodiment. In one example, the gripper device 610 moves the disc 140 towards the disc cassette device 150, contacting the bale 210.

Figure 14:
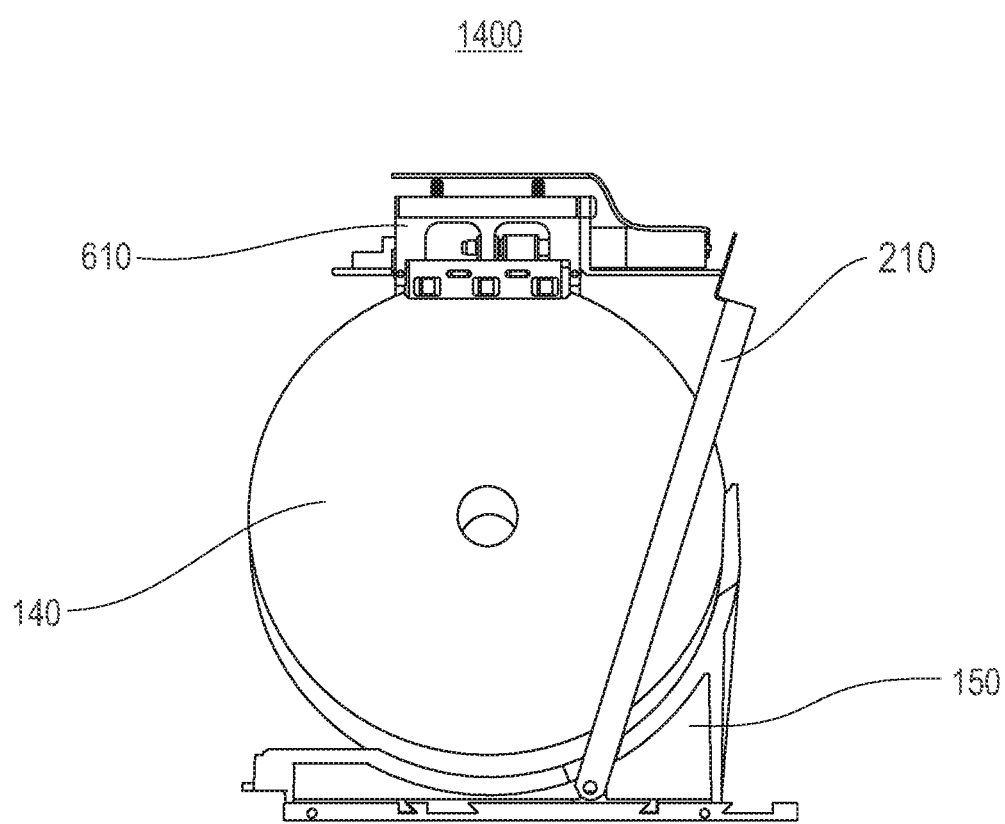
FIG. 14 shows a side view of another progressed operation of the retaining bale of the disc cassette device of FIG. 13, according to an embodiment.

FIG. 14 shows a side view 1400 of another progressed operation of the retaining bale 210 of the disc cassette device 150 of FIG. 13, according to an embodiment. In one example, the gripper device 610 has moved to the drop-off position over the disc cassette device 150 with the bale 210 moved fully back.

Figure 15:
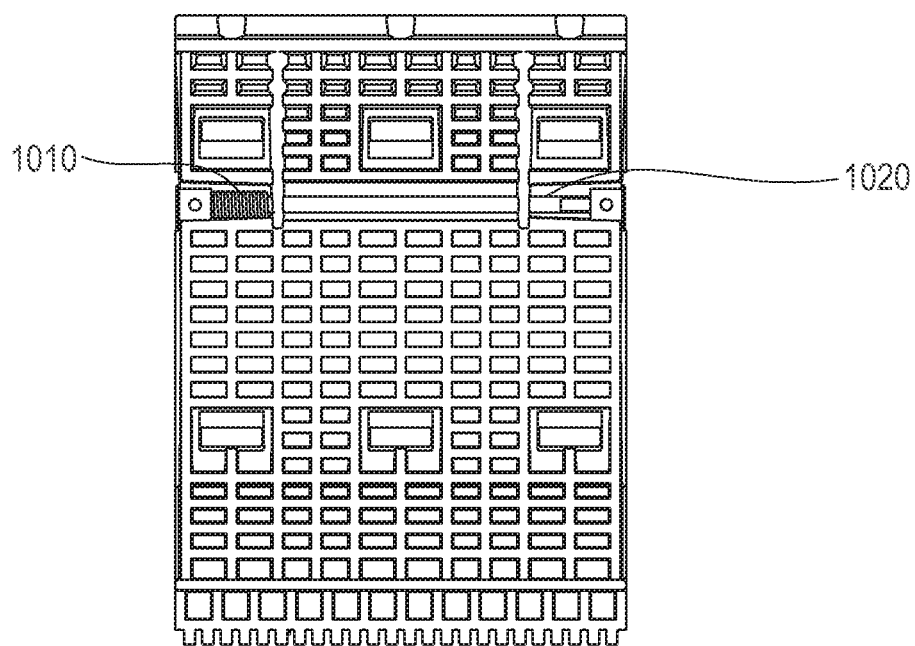
FIG. 15 shows a bottom view of the disc cassette device showing the bale return spring, according to an embodiment.

FIG. 15 shows a bottom view 150 of the disc cassette device 150 showing the bale return spring 1010 and the bale axle 1020, according to an embodiment.

Figure 16:
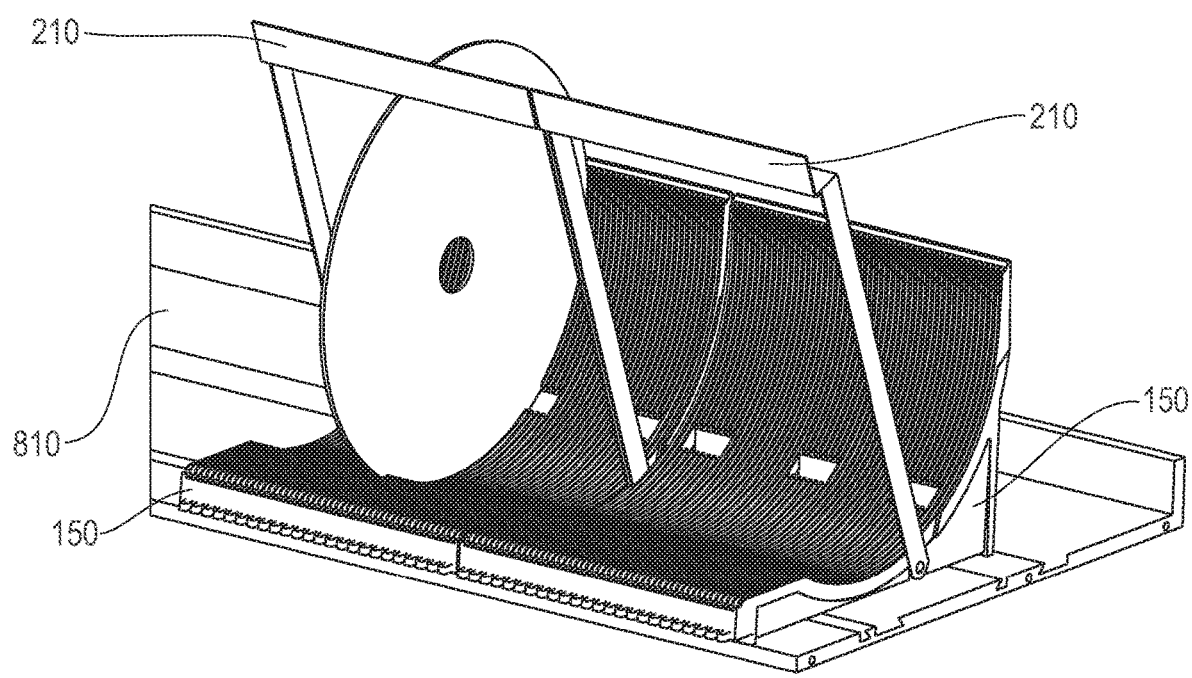
FIG. 16 shows two disc cassette devices side-by-side in a mounting rail or track, according to an embodiment.

FIG. 16 shows two disc cassette devices 150 side-by-side in a mounting rail or track 810, according to an embodiment. In one example, the arms of the bale 210 are recessed into the disc cassette device 150 sides so that bales 210 on adjacent disc cassette devices 150 do not interfere with one another when disc cassette devices 150 are tightly pressed against each other.

FIGS. 17A-B show side views 1700 of another bale 1710 of the disc cassette device 150 configured to receive a locking rod through the bale 1710 and the center hole of the discs 140, according to an embodiment. In one example, a locking rod prevents bale 1710 rotation, holding it in position to retain all of the discs 140 in the disc cassette device 150. This feature is useful for transport, loading, and unloading of disc cassette devices 150 partially or fully loaded with discs 140.

Figure 18B:
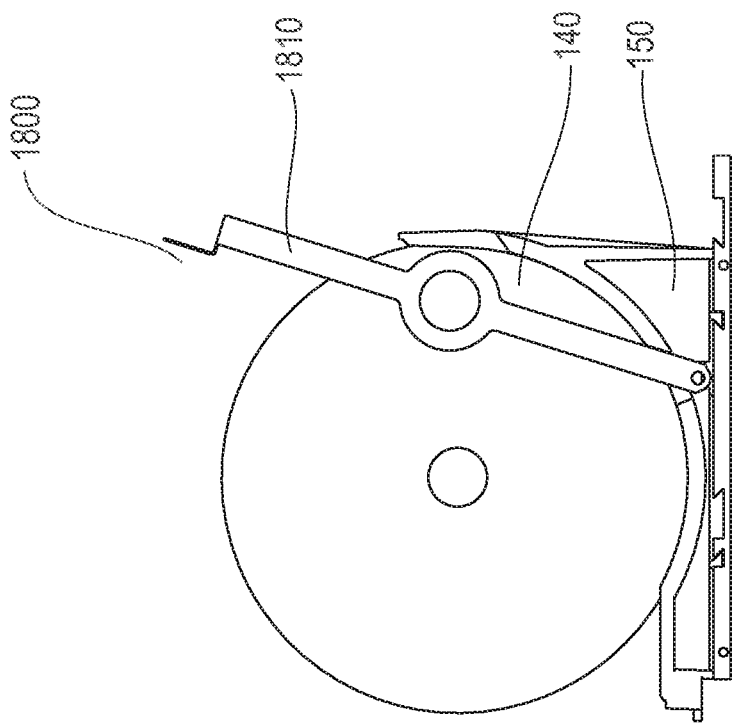
FIGS. 18A-B show side views of still another bale of the disc cassette device configured to receive a locking rod, according to an embodiment.
Figure 18A:
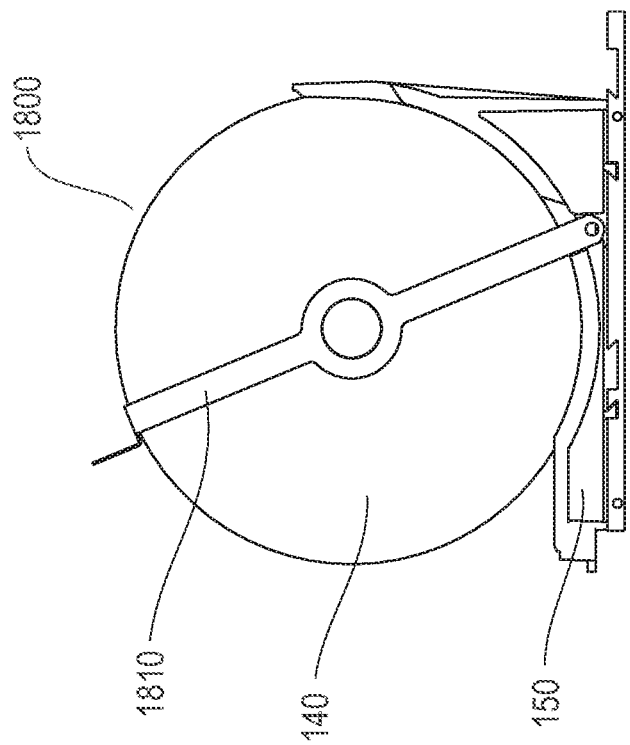

FIGS. 18A-B show side views 1800 of still another bale 1810 of the disc cassette device 150 configured to receive a locking rod, according to an embodiment. In one example, a locking rod prevents bale 1810 rotation, holding it in position to retain all of the discs 140 in the disc cassette device 150. This feature is useful for transport, loading, and unloading of disc cassette devices 150 partially or fully loaded with discs 140.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments for various embodiments with various modifications as are suited to the particular use contemplated.

What is claimed is:

1. A disc cassette comprising:
    a curved portion including multiple ribs, wherein the ribs define multiple disc slots in the curved portion that are configured to hold multiple discs in place, and the discs are spaced apart by the ribs; and
    multiple index features positioned on an inside edge of the curved portion, wherein edges of the index features are aligned with centers of the disc slots, and the index features are configured to allow alignment of a kicker device of a disc retrieval unit (DRU) to a disc of the disc cassette to lift the disc into a disc gripper device without disturbing one or more other discs of the disc cassette that are adjacent to the disc.

2. The disc cassette of claim 1, wherein positions of the index features on the inside edge of the curved portion are relative to positions of the disc slots.

3. The disc cassette of claim 2, wherein each edge of each index feature is aligned with a center of a disc slot.

4. The disc cassette of claim 3, wherein each index feature is twice as wide as a disc pitch that the ribs provide to keep the discs from contacting one another.

5. The disc cassette of claim 1, wherein the index features are configured to allow the alignment of the kicker device to the disc within 0.1 mm.

* * * * *